United States Patent [19]

Bartusek et al.

[11] Patent Number: 4,700,785

[45] Date of Patent: Oct. 20, 1987

[54] FURROW OPENER ASSEMBLY WITH INTEGRAL DOWN-PRESSURE ADJUSTMENT

[75] Inventors: Robert J. Bartusek, Des Moines; Ronald M. Steilen, Ankeny; Vernon E. Rettig, Bondurant, all of Iowa

[73] Assignee: Deere & Company, Moline, Ill.

[21] Appl. No.: 843,418

[22] Filed: Mar. 24, 1986

[51] Int. Cl.⁴ .............................................. A01B 35/24
[52] U.S. Cl. .................................... 172/705; 172/500; 111/84
[58] Field of Search .............. 172/705, 462, 572, 573, 172/497, 500, 264, 265, 707, 708, 711, 551; 111/84, 786

[56] References Cited

U.S. PATENT DOCUMENTS

| 410,436 | 9/1889 | Packham | 172/462 |
| 3,194,323 | 7/1965 | Zimmerman | 172/500 |
| 3,258,076 | 6/1966 | Groenke | 172/705 |
| 3,700,038 | 10/1972 | Essex | 172/705 |
| 4,210,210 | 7/1980 | Ankenman | 172/500 |
| 4,261,423 | 4/1981 | Williamson | 172/705 |

Primary Examiner—Richard J. Johnson

[57] ABSTRACT

A shank assembly including a rearwardly opening bracket pivotally mounting a shank. A tension link extends upwardly from a central portion of the shank and through an apertured strap. A stop member at the upper end of the link limits the downward rocking of the shank. An adjustable arm assembly including a trunnion slidably received over the tension link is pivotally connected to the bracket and adjustably compresses a down-pressure spring which encircles the link between the trunnion and the shank. Individual down-pressure adjustments can be made without affecting the transport height of the assembly.

11 Claims, 5 Drawing Figures

FURROW OPENER ASSEMBLY WITH INTEGRAL DOWN-PRESSURE ADJUSTMENT

BACKGROUND OF THE INVENTION

The present invention relates generally to agricultural implements and, more specifically, to an adjustable furrow opener assembly or similar structure having a spring which urges a shank-mounted tool downwardly into ground engagement.

Seeding implements such as grain drills or the like include a plurality of furrow openers pivotally connected to a main frame and urged into ground engagement by down-pressure springs. The springs typically are part of separate assemblies which are attached to second points on the machine. When attaching or removing an opener assembly or when changing the position of an opener assembly along the main frame, several fasteners must be removed or loosened. To increase or decrease the down-pressure for varying soil and trash conditions or to increase the pressure on the openers which run in tire tracks, the spring usually is compressed by hand while the other hand changes the position of the component bearing against the spring. This down-pressure adjustment can be very cumbersome, particularly as the pressure of the spring is increased. Conventional down-pressure adjusting structure requires numerous components for attachment to the machine, and changing openers or opener positions can be inconvenient and time consuming. With some assemblies, it is not uncommon for the transport height of the opener to be changed with changes in the down-pressure adjustment. Therefore, it is sometimes necessary to adjust the transport position of the opener assembly whenever a down-pressure adjustment is made.

OBJECTS OF THE INVENTION

It is therefore an object of the present invention to provide an improved furrow opener assembly or similar type of shank assembly. It is a further object to provide such an assembly having an improved down-pressure adjustment.

It is yet another object of the invention to provide an improved furrow opener assembly or the like with an adjustable down-pressure arrangement which is simpler in structure and less expensive to manufacture and which requires fewer components than at least most of the previously available structures. It is yet another object to provide such an assembly wherein a down-pressure adjustments can be made simply and easily without affecting the transport position of the opener assembly. It is a further object of the present invention to provide an improved furrow opener assembly which facilitates attachment of the assembly to the machine and provides easier positioning and down-pressure adjustments than most previously available assemblies.

It is still a further object of the present invention to provide an improved furrow opener assembly or the like with an integral down-pressure adjustment which can be attached by a single bracket to the implement frame. It is a further object to provide such an assembly which is easy to adjust and wherein the downwardmost position of the opener remains relatively constant regardless of the down-pressure adjustment.

BRIEF DESCRIPTION OF THE INVENTION

In accordance with the above objects, a furrow opener assembly is provided which includes a rearwardly opening bracket connected by a U-bolt to a rotatable tubular frame member of the grain drill or similar implement. The lower end of the bracket supports a downwardly and rearwardly directed shank having a lower end which carries a conventional furrow opening device such as a double disk opener or a hoe opener. The clamp extends rearwardly and upwardly from the frame and includes a central strap portion which projects upwardly and rearwardly from the top of the clamp. The strap is apertured at its upper end and a tension link extends through the slot downwardly and rearwardly to a pivotal connection with a clamp fixed to the central portion of the shank. An adjustable pressure arm is pivotally connected to the sides of the main bracket and includes a freely rotatable trunnion slidably received over the upper end of the tension link below the strap. A spring is supported on the tension link and is compressed between the shank bracket and the trunnion of the adjustable pressure arm. An aperture is provided in the pressure arm adjacent the trunnion for insertion of a tool so that the arm may be rotated about its pivotal connection with the main clamp to adjust the down-pressure of the spring. The main clamp includes side portions which are apertured to receive a keeper pin for limiting the rocking of the pressure arm to achieve the desired down-pressure. A hydraulic cylinder rotates the frame member to raise and lower the furrow opener assemblies between transport and field-working positions. The end of the tension link which extends through and above the main clamp strap includes a series of apertures for receiving a cotter pin to adjust the lowermost transport position of the opener assembly. Individual down-pressure adjustments can be made easily and quickly by rotating the pressure arm and inserting the keeper pin through one set of the apertures, and such adjustments do not affect the transport position of the assembly. Also, considerable hardware is eliminated by making the down-pressure adjustment integral with the opener assembly. Opener assemblies may be changed or repositioned by simply loosening or removing a single U-bolt.

These and other objects, features and advantages of the present invention will become apparent to one skilled in the art upon reading the following detailed description taken in view of drawings.

DESCRIPTION OF PREFERRED EMBODIMENT

Figure 1:
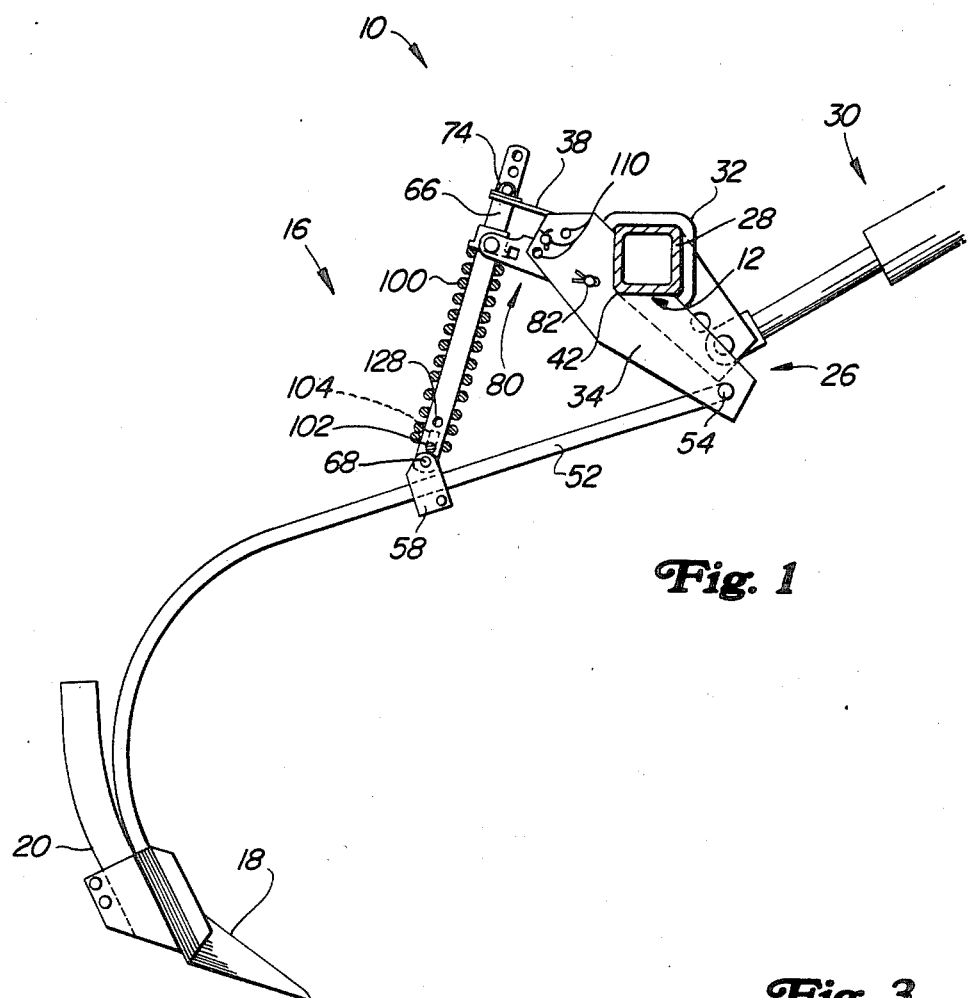
FIG. 1 is a side view of a portion of a grain drill with the furrow opener assembly of the present invention attached thereto.

Referring now to FIG. 1, therein is shown a rear portion of a conventional grain drill 10 or similar implement having a transversely extending main frame 12 supported for towing forwardly by a tractor (not shown). A plurality of transversely spaced furrow opener assemblies 16 are supported on the main frame 12 and include conventional furrow opening devices such as hoe openers 18 (FIG. 1) having conventional seed boots 20 connected through flexible seed conduits to a metered source of grain on the drill 10.

The furrow opener assembly 16 includes a main attaching clamp 26 connected to a rotatable transverse beam 28 of the main frame 12 by a U-bolt 32. An hydraulic cylinder 30 is connected to the beam 28 to rotate the beam about its longitudinal axis to move the opener assembly 16 between a lower field-working position and an upper transport position. The main clamp 26 includes a pair of side bracket plates 34 transversely spaced by a central strap 36 which extends through the main clamp 26 to an end portion 38 which projects rearwardly from the top of the main clamp. The side bracket plates 34 are notched at 42 to extend around the lower and rearward faces of the transverse beam 28. The central strap 36 includes a ninety- degree bend at location 44 to conform generally to the shape of the notch 42 and extend closely adjacent the beam 28 when the clamp 26 is attached to the frame 12. The central strap 36 is apertured on either side of the bend location 44 to receive the threaded ends of the U-bolt 32. Nuts 48 are threaded onto the U-bolt 32 and bear against the central strap 36 to secure the main clamp 26 on the beam 28.

A downwardly and rearwardly extending shank 52 is pivotally connected at its forward end between the side bracket plates 34 by a pivot 54 for permitting the shank to rock about a transverse axis located generally below and forwardly of the transverse beam 28. The shank 52 extends downwardly and rearwardly to a connection with the hoe opener 18 and seed boot 20.

Figure 5:
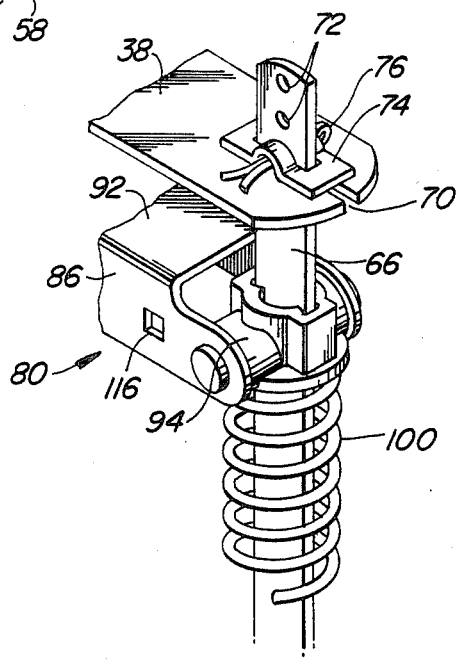
FIG. 5 is a perspective view of the upper portion of the opener assembly of FIGS. 1 and 2.

A shank clamp 58 is secured around a central portion of the shank 52 by a bolt 62. A flat tension link 66 is pivotally connected by a pin 68 to the upper portion of the shank clamp 58. The tension link 66 extends upwardly and forwardly through an aperture or slot 70 in the end portion 38 of the central strap 36. The upper end of the tension link 66 is apertured at locations 72, and a stop member 74 is supported on the link 66 by a cotter pin 75 inserted into a one of the apertures 72 to prevent the shank 52 from rocking downwardly about the pivot 54 below a preselected transport height when the assembly 16 is moved to the transport position. The stop member 74 contacts the top of the end portion 38 of the central strap 36 when the selected lowermost position is reached. Preferably, the slot 70 extends through to the end of strap 36 (FIG. 5) to facilitate manufacture of the opener assembly.

Figures 3, 4:
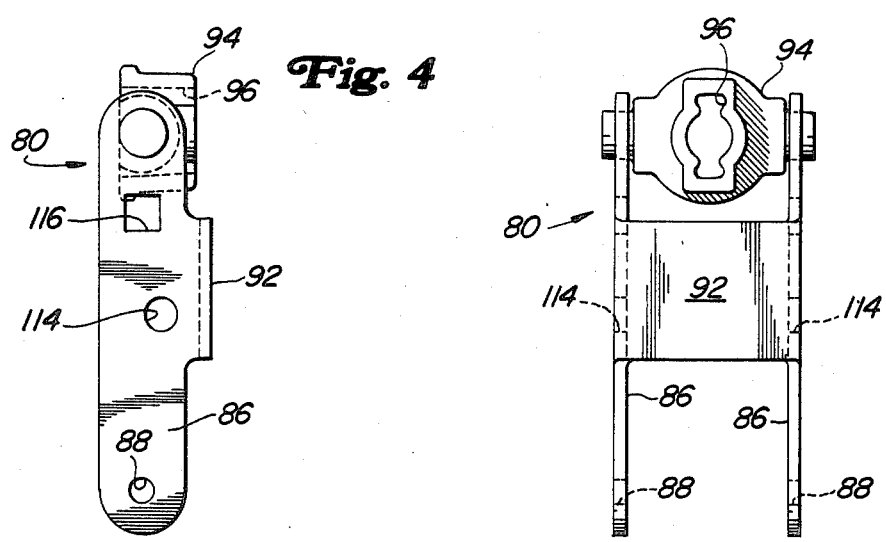
FIG. 3 is an enlarged top view of the adjustable pressure arm utilized with the opener assembly of FIGS. 1 and 2.
FIG. 4 is a side view of the arm of FIG. 3.

An adjustable pressure arm indicated generally at 80 is pivotally connected between the side bracket plates 34 of the main clamp 26 by a pivot pin 82 adjacent the bend location 44. As best seen in FIGS. 3 and 4, the adjustable pressure arm 80 includes a pair of transversely spaced side legs 86 which are apertured at 88 to receive the pin 82. An upper, flat connecting web 92 extends between the side legs 86. A trunnion 94 is freely rotatably mounted between the outermost ends of the side legs 86. The trunnion 94 includes an elongated aperture 96 which is slidably received over the tension link 66 below the end portion 38 of the strap 36. The pressure arm 80 also maintains the upper end of the link 66 within the slot 70 of the central strap 36.

A down-pressure spring 100 encircles the tension link 66 and is compressed between the shank clamp 58 and the trunnion 94 of the adjustable pressure arm 80. The lower end of the spring 100 rests on a pin 102 having a upwardly turned end 104 embracing the side of the spring.

Figure 2:
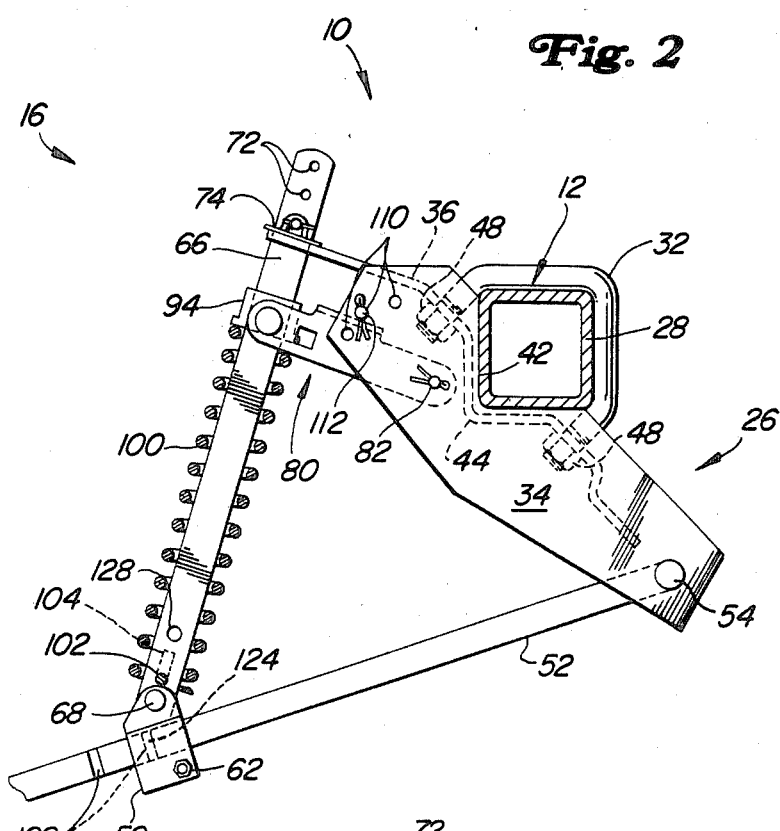
FIG. 2 is an enlarged side view of the furrow opener assembly of FIG. 1.

The side bracket plates 34 are apertured at 110 so that a keeper pin 112 (FIG. 2) can be inserted through the plates in a selected one of the pair of apertures 110 to limit the upward rocking of the arm 80 about the pivot 82 and thereby adjust the down-pressure of the spring 100. For increased adjustability, the pin 112 may be inserted either above the web 92 or through holes 114 (FIG. 4) provided in the side legs 86 of the arm 80 to limit upward rocking of the arm. The side legs 86 include a square aperture 116 adapted to receive a tool, such as the drive ratchet of a ratchet wrench, so that the spring 100 may be easily compressed with the tool for convenient removal and insertion of the pin 112 with respect to the holes 110. Therefore, to make a down-pressure adjustment, the wrench is inserted into the aperture 116 and the spring is compressed to relieve any pressure on the pin 112. Thereafter the pin 112 is removed and reinserted through another of the sets of apertures 110 to achieve a preselected down-pressure without affecting the lowermost position of the shank 52 which is determined by the location of the stop member 74.

The shank 52 is notched at a plurality of locations 122 along its length to receive a mating indentation 124 on the side of the shank clamp 58 for indexing the shank clamp on the shank at a preselected location and preventing the shank clamp 58 from moving on the shank. The operating characteristics of the opener assembly may be changed by changing the location of the shank clamp 58 on the shank 52. Also, the range of adjustment of the spring 100 may be changed by inserting the spring engaging pin 102 through a different one of a plurality of holes engaging pin 102 through a different one of a plurality of holes 128 located at the lower end of the tension link 66.

In operation, the compression spring 100 acts to bias the shank downwardly so that the hoe opener 18 remains in proper furrow forming relationship with the soil. The spring 100 permits the hoe to move up and down over irregular soil surfaces or over obstacles. If it is necessary to change the down-pressure, for example, when soil conditions change, the operator simply inserts a ratchet into the square hole 116 and applies a downward pressure to the pressure arm 80 to compress the spring and relieve the pressure against the adjusting pin 112. The operator removes the pin 112 and reinserts the pin in a different pair of apertures 110. Thereafter, he releases the ratchet and the spring urges the pressure arm 80 upwardly against the pin 112. As the shank 52 moves up and down, the tension link 66 is free to slide through the trunnion 94. When the implement is lifted from the ground, the stop member 74 contacts the top of the end portion 38 of the central strap 36 to limit the downward rocking of the shank 52.

Having described the preferred embodiment, it will be apparent that modifications can be made without departing from the scope of the invention as defined in the accompanying claims.

We claim:

1. A shank assembly adapted for connection to an implement for forward movement over the ground, said assembly comprising a generally channel-shaped bracket, means for attaching the bracket to the implement so that the bracket opens rearwardly; a shank pivotally connected to and extending rearwardly from the lower end of the bracket for rocking in an upright plane; a tension link connected to the shank rearwardly of the pivotal connection with the bracket and extending upwardly therefrom towards the mounting bracket, said mounting bracket including retaining means for slidably receiving the upper end of the link therethrough, said upper end of the link including means for preventing the shank from rocking downwardly below a preselected location; a compression spring encircling the link; and an adjustable arm connected to the bracket and including sping engaging means, located below and movable relative to the retaining means, for adjustably compressing the spring to one of a plurality of compressed states to establish downward bias on the shank without affecting the preselected downward location of the shank.

2. The invention as set forth in claim 1 wherein the spring engaging means comprises a trunnion member slidably received over the tension link between the retaining means and the upper end of the compression spring.

3. The invention as set forth in claim 1 wherein the adjustable arm is pivotally connected to the bracket for rocking about a transverse axis located above the pivotal connection of the shank with the bracket and below the retaining means.

4. The invention as set forth in claim 4 wherein the adjustable arm includes means for receiving a tool to rock the arm to a preselected adjusted position.

5. The invention as set forth in claim 1 including retaining means engageable with the bracket and adjustable arm for retaining the arm in a preselected one of a plurality of adjusted positions.

6. The invention as set forth in claim 6 wherein the bracket includes apertured sides, the adjustable arm is rockably connected to the bracket and the retaining means comprises a pin insertable through the apertured sides for limiting the rocking of the adjustable arm.

7. A shank assembly adapted for connection to an implement for forward movement over the ground, said assembly comprising a generally channel-shaped bracket, means for attaching the bracket to the implement so that the bracket opens rearwardly; a shank pivotally connected to and extending rearwardly from the lower end of the bracket for rocking in an upright plane; a tension link connected to the shank rearwardly of the pivotal connection with the bracket and extending upwardly therefrom towards the mounting bracket, said mounting bracket including a central strap having a rearwardly extending apertured portion defining retaining means for slidably receiving the upper end of the link therethrough, said upper end of the link including means for preventing the shank from rocking downwardly below a preselected location; a compression spring encircling the link; and an adjustable arm connected to the bracket and including spring engaging means, located below the retaining means, for adjustably compressing the compression spring to establish downward bias on the shank.

8. A shank-type assembly adapted for mounting on a transversely extending beam for forward movement over the soil, said assembly comprising:
 a bracket, said bracket comprising: a pair of transversely spaced, upright plates having forwardly and upwardly directed notched portions adapted for conforming to the beam, and a strap member extending upwardly between the plates and having an apertured extension portion, said strap including central apertured section adjacent the notched portion, and a U-bolt extending through the apertured section, said U-bolt having fastener means adapted for securing the notched portions against the beam;
 a shank having a forward end pivotally connected between the lower ends of the spaced plates and extending rearwardly therefrom to a central shank portion located below the extension portion of the strap;
 a tension link pivotally connected to the central shank portion and extending upwardly therefrom and slidably received through the aperture in the extension portion;
 a down-pressure spring encircling the tension link;
 an adjustable arm member pivotally connected between the spaced plates and extending rearwardly therefrom to a spring-engaging portion slidably supported with respect to the tension link, above the compression spring and below the extension portion of the strap; and
 means limiting the upward rocking of the arm member about its pivot for adjustably compressing the spring between the spring engaging portion and the shank to bias the shank downwardly.

9. The invention as set forth in claim 8 wherein the spring-engaging portion comprises a trunnion slidably received over the tension link.

10. The invention as set forth in claim 8 including means located on the tension link above the strap member for contacting the strap member to limit downward rocking of shank.

11. The invention as set forth in claim 8 wherein the aperture in the extension portion comprises a slot extending through the end of the extension portion, and wherein the arm member includes means for retaining the tension link within the slot.

* * * * *